May 14, 1968      J. L. WILSON      3,382,598
FISHING DEVICE
Filed June 6, 1966
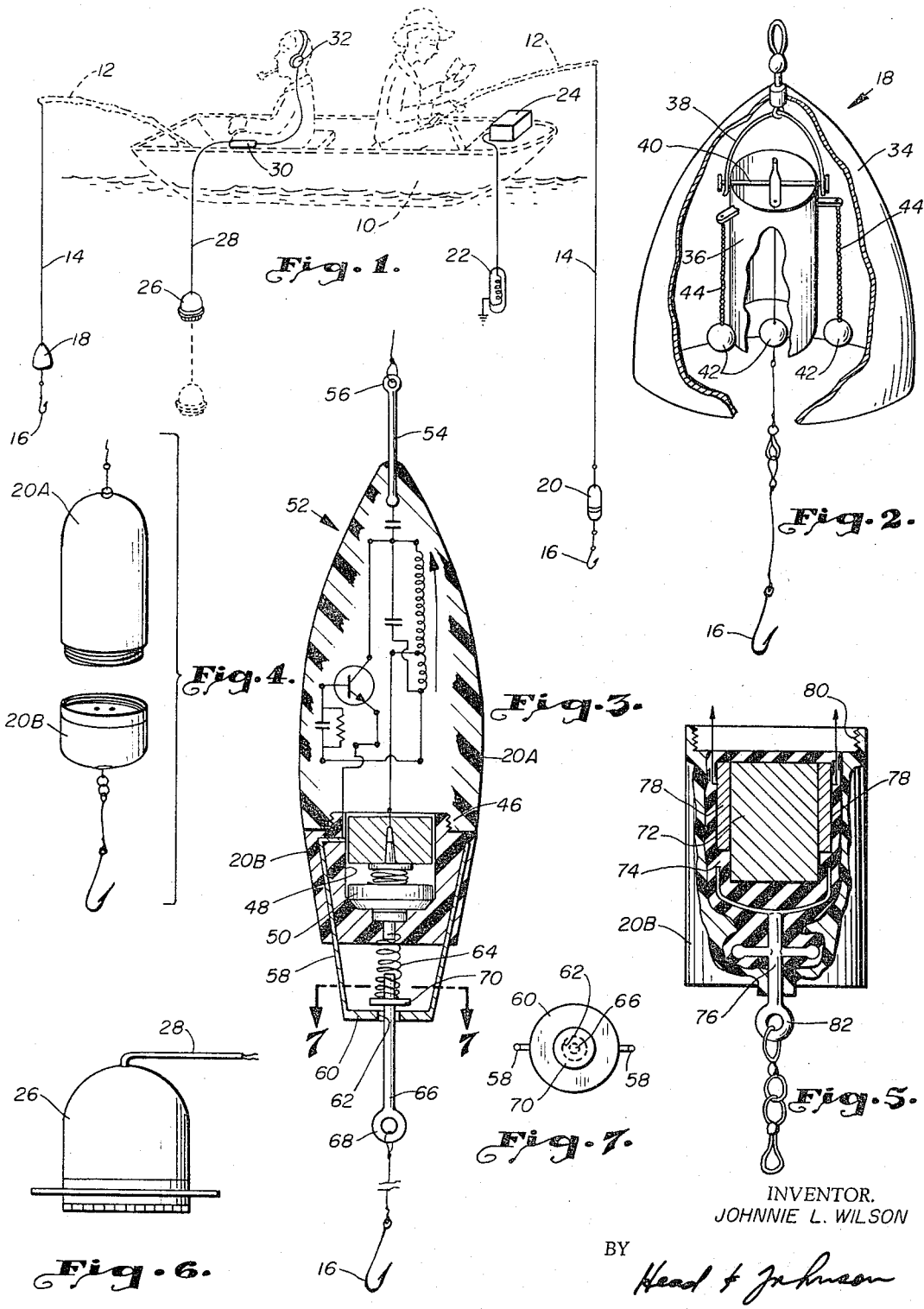
INVENTOR.
JOHNNIE L. WILSON
BY Head & Johnson
ATTORNEYS United States Patent Office 3,382,598
Patented May 14, 1968

3,382,598
FISHING DEVICE
Johnnie L. Wilson, Tulsa, Okla., assignor of one-half to
Nathan H. Horn, Tulsa, Okla.
Filed June 6, 1966, Ser. No. 555,342
7 Claims. (Cl. 43—17)

This invention relates to an improved fishing device. More particularly, the invention relates to devices for use in fishing lines whereby the taking of a bait attached to the line by fish is immediately indicated to the fisherman in far shorter time than is normally required for the action of the fish to be transmitted by way of the fishing line and pole to the attention of the fisherman.

The device of this invention takes the place of a sinker in a typical fishing arrangement and can be made to weigh as little as a fraction of an ounce. The device serves to remove guess work as to whether a fisherman has a strike or bite since any action on the bait is immediately transmitted to the attention of the fisherman.

With the normal method of fishing the strike of a fish against the bait is not felt until the strike is transmitted as a mechanical movement in an elastic medium consisting of the fishing line and pole to the attention of the fisherman. This relatively slow movement means that the fisherman frequently cannot react quickly enough to set a hook in the mouth of a fish. With the device of this invention the taking of the bait or a strike by a fish is announced to the fisherman substantially instantaneously permitting a reaction much faster than is possible with the normal fishing equipment.

It is therefore an object of this invention to provide an improved fishing device which, when utilized by a fisherman, signals the strike or the taking of the bait by a fish substantially instantaneously.

Another object of this invention is to provide a device to be included as part of the fishing line which, upon actuation of the hook by a fish, initiates a radio signal which is transmitted to a receiver antenna in the water and thence to a radio receiving set producing an audible signal as an indication that a strike or bite has taken place.

Another object of this invention is to provide a device for use in a fishing line including means whereby a strike by a fish or the taking of the bait causes an underwater audible signal and including means of detecting the under water audible signal so that the user is instantaneously apprised of the strike or bite.

These and more particular objects will be fulfilled and a better understanding of the invention will be had by referring to the following description and claims taken in conjunction with the attached drawings in which:

FIGURE 1 is a diagrammatic representation of the manner in which the devices of this invention are utilized by fishermen.

FIGURE 2 is an enlarged side view of a noise initiating device as utilized in the invention, the device being shown partially cut-away to disclose the interior mechanism.

FIGURE 3 is an enlarged side view of a fishing device of the invention, the view including the schematic of an arrangement for producing a radio frequency signal in response to a fish biting or striking the hook attached to the device.

FIGURE 4 is an external side view of the basic radio signal generating device of the invention showing the arrangement wherein the lower portion is removable for the insertion of a battery.

FIGURE 5 is a side view shown cut-away, of an alternate arrangement of this invention utilizing a crystal pickup system which is attached as a lower portion of the overall radio signal generating device, the lower portion being utilized as indicated in FIGURE 4.

FIGURE 6 is an enlarged side view of an underwater microphone as utilized in one embodiment of the invention.

FIGURE 7 is a cross-sectional view taken along the lines 7—7 of FIGURE 3 showing the arrangement of an all-directional switch utilized in the invention.

Referring now to the drawings, and first to FIGURE 1, the application of the invention is shown of two fishermen each seated in the boat having a fishing pole 12. Attached to each pole is a typical fishing line 14 having at the lower end thereof a hook 16. Above the hook 16, as a part of the line 14 utilized by the fisherman to the left, is a sound producing device 18, which may be termed a sound generator, which device substitutes for the weight or sinker usually used. In the line as utilized by the fisherman to the right is a radio signal generating device 20 which, upon actuation of the hook 16, radiates a radio signal which is picked up by receiving antenna 22 and carried to a radio receiver 24.

The application of the invention as applied to the fisherman at the left will be first described. Suspended in the water from the boat is an underwater microphone 26 adaptable to receive audio signals, the signals being conducted by wire 28 to an audio amplifier 30. Amplifier 30 may drive a loud speaker, or of ear phones 32 as illustrated. Basically the invention works as follows: When a fish strikes hook 16, or bites or in any way moves by any slight amount the hook 16, sound waves are generated by the sound generator 18. These sound waves are picked up by the microphone 26 and by way of the audio amplifier and ear phones 32, the fisherman knowing substantially instantaneously of the strike or bite. The signal received by the fisherman is much more rapid than is the physical effect of the movement of the hook transmitted solely by way of line 14 and pole 12 to the attention of the fisherman.

Referring to FIGURE 2, one embodiment of the sound generator 18 is shown. Basically the sound generator 18 includes an inverted bell 34 having a cylinder 36 suspended therein from a bail 38. Suspended within the cylinder 36 upon rod 40 is a weight 42, functioning of a clapper. Additionally clappers 42 are suspended from chains 44 externally of the cylinder 36. The bell 34 forms an air pocket so that the clappers 42 and cylinder 36 are freely movable when the device is submerged in water. Hook 16 is connected to the clapper 42 so that any movement of the hook moves the clapper against the cylinder 36 causing sound waves in the water. The other clappers surrounding the cylinder augment the generation of audio signals when any slight movement of the hook 16 occurs.

The underwater microphone 26 may be of any general type as long as it is waterproof. The audio amplifier 30 is of a normal type, preferably having variable amplitude for driving a loudspeaker or earphones 32.

Additional advantage of the use of the underwater microphone 26 is that the sound made by fish in the vicinity of the bait can be detected and thereby apprise the fisherman to be ready in case of a bite or strike.

The system utilized by the fisherman to the right includes the use of radio waves in place of audio waves. The radio signal generating device 20, in the preferred embodiment, consists of two portions as illustrated in FIGURE 4, that is, an upper portion 20A and a lower portion 20B. The main reason for the separation of the upper and lower portions 20A and 20B is to provide means for receiving a battery within the device.

One embodiment of the radio signal generating device 20 is illustrated in an enlarged view diagrammatically and schematically in FIGURE 3. The upper and lower portions 20A and 20B may be each formed of plastic and include a male and female threaded portion 46 whereby the components are threadably separated. The lower portion 20B includes a recess 48 which receives a battery 50 which functions to energize the radio frequency generating system 52 contained in the upper portion 20A.

The radio frequency generating system is schematically illustrated including a single transistor oscillator arrangement which, upon energization, provides a radio signal at the antenna rod 54. The antenna rod 54 includes an eyelet 56 at the upper end whereby the devices are connected to a fishing line.

Extending from the lower end of lower portion 20B are spaced support rods 58 which hold, at the lower end thereof, a contact ring 60 having an opening 62 therein. Extending from the lower end of body portion 20B, and forming a part of the radio signal generating circuit 54, is a spring 64 connecting to a metal tie rod 66. The tie rod 66 is received in opening 62 of the contact ring 60 and has an eyelet 68 at the lower end thereof to receive a fishing line which connects to hook 16.

Above the contact ring 60 and below spring 64 is a stop member 70, normally spring 64 holds the tie rod 66 and stop member 70 out of engagement with the contact ring 60 so that no direct connection is made, forming, in effect, an all directional switch. The movement of the fish hook by a fish displaces the tie rod 66 against contact ring 60 closing the switch and energizing the radio signal generator 52. A downward displacement of hook 16 causes the stop member 70 to engage ring 60 to energize the radio signal generator 52 and, in addition, limits the downward movement of the tie rod 66 so that spring 64 is not stretched beyond its elastic limit.

The radio signal generator 52 can take numerous forms, and may be constructed to be very small, not appreciably greater in size than the lead weight normally used on fishing lines. In such small sizes the radio signal generator 20 may weight only a fraction of an ounce.

An alternate arrangement of the radio signal generator system of this invention is shown in FIGURE 5 which shows the arrangement of the lower portion 20B only. The lower portion 20B of FIGURE 5 takes the place of the all-directional switch of FIGURES 3 and 7. A piezoelectric crystal 72 is mounted in resilient casing 74. A vibration pickup member 76 extends externally of the resilient casing. Conductive plates 78 contact the crystal 72 and carry an electric voltage generated by the crystal when it is deflected, in much the same way that a typical electric phonograph functions. Threads 80 in the plastic lower portion housing 20B provide means of supporting the lower portion to the upper transmitter circuit containing portion 20A of the radio signal generating device 20. An eyelet 82 in the lower end of the pickup member 76 affords means of attaching a fish hook. When a fish strikes or bites the hook affixed to pickup member 76 a voltage is generated by crystal 72 which is conducted to modulate the radio frequency generating circuit 52.

The device used by the fisherman to the right in FIGURE 1 operates as follows: Radio receiver 24, which may be a standard broadcast band receiver, is tuned to a quiet spot on the dial. Radio signal generating device 20 is set to radiate a frequency, when energized, which is received by the radio receiver 24 to produce an audible sound. With the equipment in position as shown in FIGURE 1 a fish biting or striking hook 16 causes a radio signal to be transmitted by radio signal generating device 20 to underwater antenna 22 which is conveyed to receiver 24 and converted into an audible sound.

Thus the fisherman knows instantaneously when a fish bites, much more rapidly than he would if he had to wait until the pull on the hook is physically transmitted by the line 14 and pole 12 to his attention.

While the invention has been described with a certain degree of particularity it is manifest that many changes may be made in the arrangement of components and other details without departing from the spirit and scope of the invention.

What is claimed:

1. For use with a fishing line having a fish hook at one end thereof, the combination comprising:
    an indicating signal generating means in said line responsive to originate a signal when said hook is displaced;
    an underwater signal receiving means remotely spaced from said signal generating means and responsive to said signal originated by said signal generating means; and
    an audio signal generating means actuated by said signal receiving means providing an audio signal when said hook is displaced.

2. The combination according to claim 1 wherein said signal generating means includes an audio signal generating means and wherein said underwater signal receives means includes a microphone.

3. The combination according to claim 2 wherein said signal generating means includes an enclosure having an air pocket therein and including at least two metallic members thereon, one of which is pendulously supported to strike against the other when said hook moves said enclosure.

4. The combination according to claim 1 wherein said indicating signal generating means includes a radio signal generating means, wherein said underwater signal receiving means includes an antenna, and wherein said audio signal generating means includes a radio receiver having an audio output element.

5. The combination according to claim 4 wherein said radio signal generating means includes a body portion having a radio transmitter therein, a battery and a switch in series electrical connection, a portion of said switch being connected to said fish hook whereby the movement of said hook actuates said switch to energize said radio transmitter.

6. The combination according to claim 5 wherein said switch includes a metallic ring portion affixed to said body portion at the lower end thereof, a vertical metallic tie rod received by said ring, said tie rod having an external diameter less than the internal diameter of said ring, the lower end of said tie rod having connection to said hook, and a spring flexibly supporting the upper end of said tie rod to said body, said spring normally supporting said tie rod in non-contacting relationship to said ring, said tie rod having a portion engaging said ring to close said switch when said fish hook is moved.

7. The combination according to claim 6 wherein said tie rod portion is a stop member of dimension greater than the opening in said ring, said stop member affixed to said tie rod above said ring and normally held in spaced relationship to said ring by said spring, said stop member engaging said ring to close said switch and limit the extension of said spring when said hook is displaced away from said body.

References Cited

UNITED STATES PATENTS 1,522,471   1/1925   Siino _____ 43—17

SAMUEL KOREN, *Primary Examiner.*

D. J. LEACH, *Assistant Examiner.*